Feb. 1, 1966  S. M. TERRY ETAL  3,233,132
INDUCTOR ALTERNATOR
Filed March 28, 1962
2 Sheets-Sheet 1
FIG. 1
FIG. 4
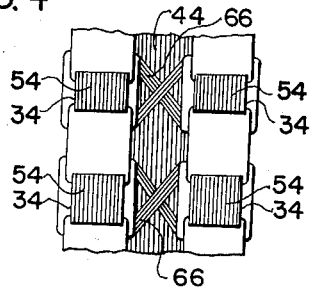
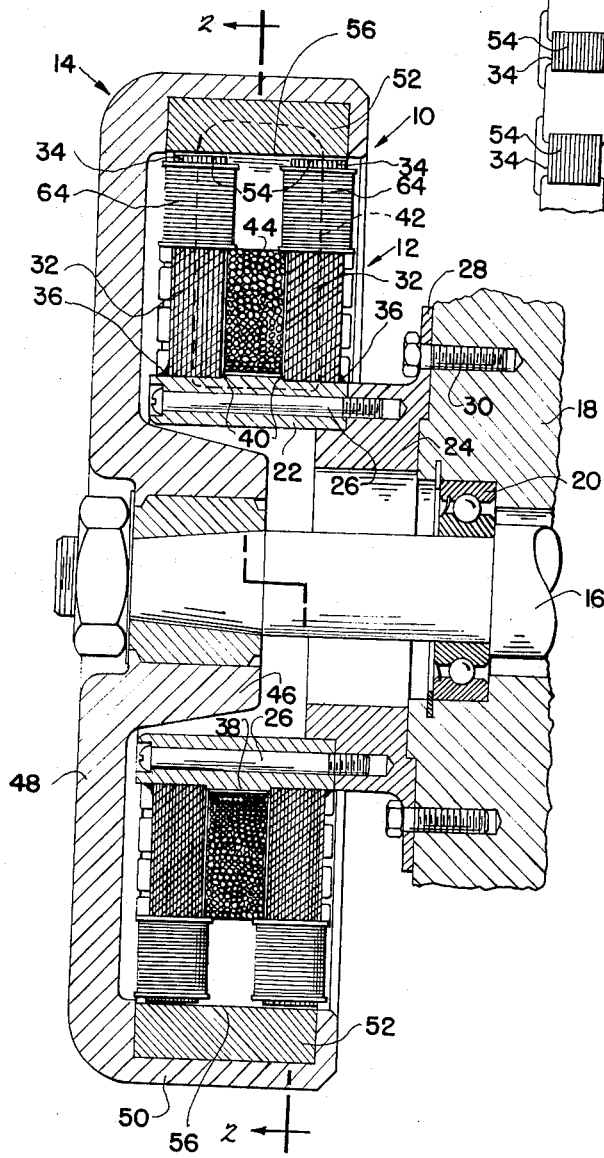
INVENTOR.
STANLEY M. TERRY
BOB O. BURSON
BY Teller, McCormick, Paulding & Huber
ATTORNEYS

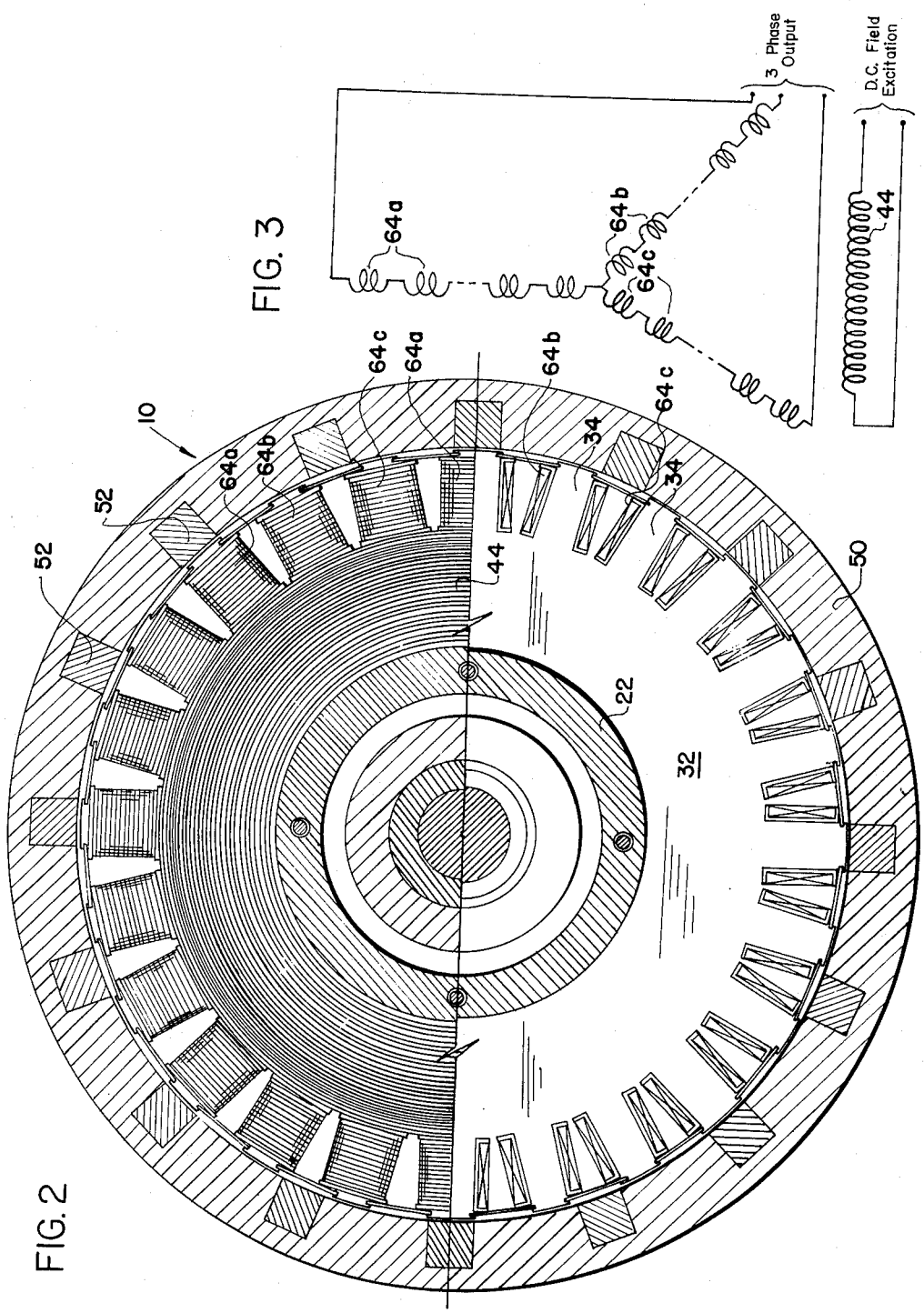

3,233,132
INDUCTOR ALTERNATOR
Stanley M. Terry and Bob O. Burson, Longmeadow, Mass., assignors, by mesne assignments, to R. E. Phelon Company, Inc., East Longmeadow, Mass., a corporation of Massachusetts
Filed Mar. 28, 1962, Ser. No. 183,298
4 Claims. (Cl. 310—168)

This invention relates to inductor alternators, and deals more particularly with such an alternator wherein the armature and field windings are contained on an inner stator structure surrounded by an outer rotor or inductor adapted to induce flux changes in the stator structure and which may additionally serve as a flywheel for the associated drive device.

The general object of this invention is to provide an improved inductor alternator having an economy of space and materials and which makes a highly efficient use of the flux established by the field winding so as to minimize the amount of field excitation required for a given output.

Another object of this invention is to provide an inductor alternator having a basic design which may be readily modified to produce a single phase output or a three-phase or other polyphase output.

A further object of this invention is to provide an inductor alternator which is very simple to manufacture. In keeping with this object, it is a more specific object to provide an inductor alternator having a rotor which may be essentially fabricated by a simple casting operation and to provide a stator construction wherein the armature and field coils may be pre-wound as separate units before being assembled with the other parts of the stator.

Other objects and advantages of the invention will be apparent from the following description and from the drawing forming a part hereof.

The drawings show preferred embodiments of the invention and such embodiments will be described, but it will be understood that various changes may be made from the constructions disclosed, and that the drawings and description are not to be construed as defining or limiting the scope of the invention, the claims forming a part of this specification being relied upon for that purpose.

Of the drawings:

FIG. 1 is a sectional view of an inductor alternator embodying the present invention and which view is taken on a plane passing through the axis of rotation of the rotor.

FIG. 2 is a transverse sectional view of the inductor alternator of FIG. 1 and taken on the line 2—2 of FIG. 1.

FIG. 3 is a schematic wiring diagram showing one way in which the various windings of the alternator may be interconnected.

FIG. 4 is a view looking toward the faces of two laterally adjacent stator poles and shows an alternate method of winding the stator poles of the alternator of FIG. 1.

Turning now to the drawings, and first particularly referring to FIGS. 1 and 2, these figures shown an inductor alternator 10 embodying the present invention and comprising an inner stator structure 12 and an outer rotor 14. The stator and rotor may take various different forms depending on the application and as shown in the illustrated case the alternator may be of the flywheel type adapted for attachment to an output shaft of an internal combustion engine or other drive device requiring a flywheel. In FIGS. 1 and 2, for example, the shaft 16 may be taken to be an auxiliary output shaft of an internal combustion engine and the part shown at 18 to be the engine block. The shaft 16 extends outwardly from the block 18 and is journaled in an opening in the block by a ball bearing unit 20.

The stator 12 is annular in shape and surrounds the shaft 16 with the axis of the shaft 16 being coincident with the central axis of the stator. Included in the stator 12 is an annular inner member 22 made of magnetic material such as iron and attached at one end to a spacer 24 by a plurality of screws 26, 26 which pass loosely through openings in the inner member and are threaded into the spacer 24 as shown in FIG. 1. The spacer 24 is made of a non-magnetic material such as aluminum so as to magnetically insulate the inner member 22 from the engine block and to thereby prevent the leakage of magnetic flux from the stator to the engine block. The spacer also serves to hold the stator to the engine block and for this purpose includes a radial flange 28 which is secured to the engine block by a plurality of screws 30, 30 which pass through the flange and threadably engage the engine block.

Supported on the outer surface of the inner stator member 22 are two annular and radially extending core structures 32, 32 each of which along its radially outer margin is shaped to define a plurality of radially extending and angularly spaced armature poles 34, 34. The two core structures 32, 32 are preferably laminated as shown in FIG. 1 and are laterally or axially spaced from each other so as to define two laterally spaced annular series of circumferentially spaced poles 34, 34. The two core structures 32, 32 have an equal number of poles 34, 34, there being twenty-four such poles on each core structure in the illustrated case. The spacing between the poles 34, 34 on either one of the two core structures 32, 32 may follow various different patterns, but preferably and as illustrated the poles are equally spaced around the entire circumference of the core structure. In any event, the two core structures 32, 32 are identical in regard to the spacing and shape of the poles 34, 34 thereon and the two core structures are arranged on the inner member 22 in such a manner that each pole of one core structure is laterally aligned with a corresponding pole of the other structure.

The core structures 32, 32 are fixed to the inner stator member 22 in any suitable manner such as by means of fillet welds 36, 36 between the end faces of the core structures 32, 32 and the member 22 as shown in FIG. 1. On its outer surface the inner member 22 includes a radially enlarged medial portion 38 which provides two shoulders 40, 40 which engage the opposing inner faces of the cores 32, 32 and maintain the desired separation between the cores during assembly of the stator.

Between the two core structures 32, 32 is an annular field coil 44 which surrounds the medial portion 38 of the inner member 22. This field coil is adapted to be energized by a direct current source and when so energized establishes a magnetic field or flux path as indicated by the broken line 42 in FIG. 1. The magnetic flux established by the field coil 42 passes through the laterally adjacent armature poles 34, 34 and the radially inner portions of the cores 32, 32 and the inner member 22 serve to provide a low reluctance path for the flow of magnetic flux between the inner ends of the armature poles. In passing between the outer ends of two laterally adjacent armature poles the flux passes through the rotor 14 as hereinafter described.

The rotor 14 includes an apertured hub portion 46 which is attached to the shaft 16 for rotation thereby, a web portion 48 and an axially extending flange portion 50. The flange portion 50 surrounds the two annular series of armature poles 34, 34 and in combination with the web portion serves as a housing for the stator. Carried by the flange portion 50 are a plurality of angularly spaced and axially extending elements made of a magnetic material. These elements may take various different forms, but in the illustrated case are shown to consist of bars 52, 52 having a substantially square cross section and made of magnetic material such as laminated iron. As shown best in FIG. 1 the bars 52, 52 are so arranged that they bridge the gap between the two core structures 32, 32 and extend across the end faces 54, 54 of each pair of laterally adjacent armature poles 34, 34. The armature pole end faces 54, 54 are of uniform circumferential length and are all located in a common cylinder concentric with the axis of the shaft 16. The inwardly facing surfaces 56, 56 of the bars 52, 52 are likewise of uniform circumferential length and are located in a common cylinder concentric with the axis of the shaft 16 and this cylinder is only slightly larger than the cylinder containing the armature pole end faces. Therefore, when the rotor 14 is rotated the magnetic bars 52, 52 move over the armature pole end faces 54, 54 and are separated therefrom by a relatively small air gap.

As any one magnetic bar 52 becomes aligned with a pair of laterally adjacent armature poles 34, 34, as shown in FIG. 1, the bar 52 provides a path for the flow of magnetic flux between the two end faces of such poles. Likewise, when the bar moves out of alignment with the two poles the low reluctance flux path between the outer ends of the poles is removed and little or no flux will flow between the end faces. Therefore, the magnetic bars 52, 52 serve to vary the flux passing through each pair of laterally adjacent poles as the bars are in succession brought into and out of alignment or bridging relationship with such poles by rotation of the rotor. When a bar 52 is in fully aligned relationship with a pair of laterally adjacent armature poles, the flux passing through such poles will be at a maximum. Similarly, when the same poles are located midway between two circumferentially adjacent bars 52, 52 the flux passing through such poles will be at a minimum.

Depending on the arrangement of the armature poles 32, 32 various different arrangements of the stator bars 52, 52 may be employed to provide different types of output from the alternator 10. In the illustrated case where the armature poles 34, 34 are equally angularly spaced around the circumference of the stator, the rotor bars 52, 52 are likewise equally angularly spaced from one another. Also, for every three pairs of laterally adjacent armature poles there are two rotor bars 52, 52. Thus, since in the present case the stator is illustrated as having twenty four pairs of armature poles the rotor is provided with sixteen bars 52, 52. By this arrangement it will be noted that each armature pole will be out-of-phase by plus or minus 120 electrical degrees respectively with respect to the two poles on either circumferential side thereof. As explained hereinafter, this provides the alternator 10 with a three-phase electrical output. From this it will also be understood by those skilled in the art that by varying the spacing, arrangement and number of bars 52, 52 and poles 34, 34 the alternator 10 may be adapted to produce a single phase output or some other type of polyphase output different from the three-phase output provided by the illustrated alternator. Also the relative lengths of the armature pole end faces 54, 54 and the inwardly facing bar surfaces 56, 56 and the spacing between the adjacent bar surfaces 56, 56 and between adjacent bar surfaces 56, 56 and between adjacent bar surfaces 56, 56 will have some bearing on the character of the output derived from the alternator. In the illustrated and presently preferred case the circumferential length of the bar surfaces 56, 56 are approximately equal to the circumferential length of the armature pole end faces, and the circumferential length of the space between the opposing edges of two adjacent armature pole end faces is approximately equal to the circumferential length of the end faces.

The rotor bars 52, 52 may be secured to the rotor flange 50 by various different means and should be magnetically insulated from each other. Preferably, and as illustrated, the rotor is made of a cast non-magnetic material such as aluminum and the bars 50, 50 are inserts which are placed into the mold prior to the casting operation so as to become embedded in the base or cast material during the casting operation. In any event, the inwardly facing surfaces 56 of the bars 52, 52 are exposed and are not covered by the base material of the flange so that the bars will pass in closely spaced relationship to the end faces of the stator poles. Preferably, when the rotor is cast the flange is cast with a thickness greater than the desired end product and thereafter the inner surface of the flange is machined to cut away some of the bar material and some of the base material to provide a cylindrical surface containing the inwardly facing surfaces 56, 56 of the bars 52, 52. By this process any cast material covering the inner surface of the bars is removed and the inner surface of the flange which contains the bar surfaces 56, 56 is a single, smooth and continuous surface made up in part of the material of the bars 52, 52 and in part of the base material of the flange 50.

An electrical output is derived from the alternator 10 by placing on each of the armature poles 34, 34 an armature coil in which, because of the variation in the magnetic flux passing through the associated pole, is induced an alternating e.m.f. As shown in FIGS. 1 and 2, the armature coils may consist of a plurality of spool coils 64, 64 each surrounding a respective one of the armature poles 34, 34. The voltages produced in every third coil will be in phase with each other and the voltages produced in any one coil will be plus or minus 120 electrical degrees out-of-phase with the voltages produced in the coils located to either side thereof. Therefore, the coils 64, 64 may be divided into three different phase groups as indicated by the subscripts $a$, $b$ and $c$ and connected as shown in FIG. 3 to produce a three-phase output. From FIG. 3 it will be observed that the coils 64$a$, 64$a$ of the first phase group are connected in series, the coils 64$b$, 64$b$ of the second phase group are connected in series and the coils 64$c$, 64$c$ are also connected in series. These phase groups are then in turn connected in the familiar Y manner to produce the three-phase output. If desired the three phase groups could also be connected in delta fashion.

In FIG. 4 there is shown an alternate method of winding the armature coils and in which case each pair of laterally adjacent armature poles 34, 34 is wound by a single "figure-eight" winding 66 having two loops which respectively surround or at least partially surround the two armature poles comprising the pair. In each pair of laterally adjacent armature poles the flux passes in opposite directions through each of the two poles comprising the pair, but by means of the figure-eight winding each loop of the winding is wound in the opposite direction from the other loop around its associated stator pole. Therefore, the net effect is that the two voltages induced in the two loops of each figure-eight winding are in series aiding relationship so that they add to each other to produce a net output from the winding. When used in an alternator such as shown in FIGS. 1 and 2, the figure-eight windings may also be divided into three different phase groups and interconnected by the method shown in FIG. 3 to produce a three-phase output from the alternator.

The invention claimed is:

1. In an inductor alternator, the combination comprising an annular stator structure having a central axis and defining two axially spaced annular series of circumferentially spaced armature poles, said two series having an equal number of equally angularly spaced poles with each pole of one series being laterally aligned with a corresponding pole of the other series and said poles of both series having pole faces of substantially uniform circumaxial length, said stator structure also including means defining a low reluctance path for the flow of magnetic flux between the inner ends of the poles of one of said series and the inner ends of the poles of the other of said series, an annular field coil located between said two series of poles for establishing a magnetic flux field in said stator structure, a rotor adapted for rotation about said central axis and having an annular portion which moves circumaxially along said two series of armature poles as said rotor is rotated and which rotor portion includes a plurality of equally angularly spaced and axially extending bridging elements of magnetic material which elements axially bridge the space between said two series of poles and thereby vary the flux passing through each pair of laterally adjacent poles as said elements are in succession brought into and out of bridging relationship with such poles by rotation of said rotor, said bridging elements being entirely separate and magnetically insulated from one another and having faces with circumaxial lengths no greater than the circumaxial spacing between circumaxially adjacent pairs of said armature pole faces so that each of said bridging elements at no time circumaxially overlaps and axially bridges portions of more than one pair of laterally adjacent armature poles and with the result that the flux passing through each bridging element is confined to a path extending axially between said two series of armature poles, and a plurality of armature coils arranged on said armature poles.

2. In an inductor alternator, the combination as defined in claim 1 further characterized by said two series of armature poles extending radially beyond said annular field coil toward said bridging elements, and said armature coils numbering one half the total number of said armature poles, each of said armature coils being a figure-eight coil respectively associated with one pair of laterally adjacent armature poles with one loop thereof surrounding one pole of said one pair and with the other loop thereof surrounding the other pole of said one pair so that the portion of said figure-eight coil which extends between said one pair of poles is radially located between said annular field coil and said annular rotor portion.

3. In an inductor alternator, the combination as defined in claim 1 further characterized by said rotor including exactly two of said bridging elements for every three of said pairs of laterally adjacent armature poles.

4. In an inductor alternator, the combination as defined in claim 1 further characterized by the circumaxial length of said bridging element faces being approximately equal to the circumaxial length of said armature pole faces and to the circumaxial length of the space between two adjacent armature pole faces.

References Cited by the Examiner
UNITED STATES PATENTS

| | | | |
|---|---|---|---|
| 499,446 | 6/1893 | Kelly et al. | 310—168 |
| 606,863 | 7/1898 | Gutmann | 310—168 |
| 2,071,953 | 2/1937 | Schou | 310—168 |
| 2,769,106 | 10/1956 | Dembowski | 310—168 |
| 2,928,962 | 3/1960 | Gayler | 310—153 |
| 2,976,439 | 3/1961 | Kiekhaefer | 310—153 |

ORIS L. RADER, *Primary Examiner.*

MILTON O. HIRSHFIELD, *Examiner.*